United States Patent [19]
Ota et al.

[11] Patent Number: 5,920,529
[45] Date of Patent: Jul. 6, 1999

[54] METHOD AND APPARATUS FOR REPRODUCING DATA RECORDED IN A RECORDING MEDIUM ON A SECTOR BASIS

[75] Inventors: Kiyoshi Ota, Tokyo; Hajime Nitta; Toshiyuki Ishii, both of Kanagawa, all of Japan

[73] Assignee: Sony Corporation, Tokyo, Japan

[21] Appl. No.: 08/940,283

[22] Filed: Sep. 30, 1997

Related U.S. Application Data

[63] Continuation of application No. 08/522,562, Sep. 1, 1995, abandoned.

[30] Foreign Application Priority Data

Sep. 5, 1994 [JP] Japan .................................. 6-234526

[51] Int. Cl.$^6$ ........................................................ G11B 5/09
[52] U.S. Cl. ............................... 369/47; 369/60; 369/48; 386/126; 386/84
[58] Field of Search .............................. 369/48, 59, 60, 369/58, 47; 360/27; 386/124, 125, 126, 96, 104, 84

[56] References Cited

U.S. PATENT DOCUMENTS

| | | | |
|---|---|---|---|
| 4,161,753 | 7/1979 | Bailey et al. | 358/128 |
| 5,200,944 | 4/1993 | Souma | 369/48 |
| 5,245,594 | 9/1993 | Shimizu | 369/48 X |
| 5,325,347 | 6/1994 | Sako | 369/48 |
| 5,511,054 | 4/1996 | Oishi et al. | 369/59 |
| 5,519,681 | 5/1996 | Maeda et al. | 369/48 X |
| 5,592,450 | 1/1997 | Yonemitsu et al. | 369/48 |

FOREIGN PATENT DOCUMENTS

| | | |
|---|---|---|
| 0 291 028 | 11/1988 | European Pat. Off. . |
| 0 479 188 | 4/1992 | European Pat. Off. . |
| 0 543 667 | 5/1993 | European Pat. Off. . |
| 0 602 943 | 6/1994 | European Pat. Off. . |
| 2 187 008 | 8/1987 | United Kingdom . |

OTHER PUBLICATIONS

Patent Abstracts of Japan, vol. 14 No. 465 (P[1114], Oct. 9, 1990 & JP–A–02 185766 (Cannon Inc) Jul. 20, 1990, Abstract.

*Primary Examiner*—Andrew L. Sniezek
*Attorney, Agent, or Firm*—Frommer Lawrence & Haug, LLP.; William S. Frommer; Dennis M. Smid

[57] ABSTRACT

A method and apparatus for reproducing data recorded in a sector basis from a recording medium. The data recorded in each sector may include audio and/or video data and the data of each sector may be arranged in one or more packets wherein each packet may include a packet start code and a stream identification code located at the beginning of the respective packet which may indicate whether audio or video data is included in the respective packet and/or the type of data included therein. Sector information associated with the sector is detected from the read data. Writing and reading operations of the data read from the recording medium into and from a memory are controlled based on the detected information. As a result, the time required to recover from the occurrence of an error may be reduced.

6 Claims, 10 Drawing Sheets

STRUCTURE FOR INTER-FRAME PREDICTION

STRUCTURE OF RECORDED FRAMES

METHOD AND APPARATUS FOR REPRODUCING DATA RECORDED IN A RECORDING MEDIUM ON A SECTOR BASIS

This application is a continuation of application Ser. No. 08/522,562, filed Sep. 1, 1995, now abandoned.

BACKGROUND OF THE INVENTION

1. Field of the Invention

The present invention relates to a method and apparatus for reproducing data suitable for the reproduction of video data, audio data and the like recorded on an optical disc, magneto-optical disc, or the like.

2. Description of the Related Art

The MPEG (moving picture coding experts group) method has been known as a method for compressing and encoding digital moving picture signals recorded on a digital video disc (hereinafter referred to as DVD). An example of an encoder of this MPEG type will now be described with reference to FIG. 7. In the encoder shown in FIG. 7, a motion detection circuit 101 converts a digitized image input signal into blocks (MB) which are minimum units for prediction for motion compensation, and motion vectors are detected for each block to allow the prediction for motion compensation.

Such blocks are subjected to predictive encoding in a predictive encoding portion which is downstream of the detection circuit. The blocks are classified into (1) intrablocks which are the result of direct DCT (discrete cosine transformation) on the image input signals, (2) forward blocks which are the result of only prediction in the forward direction, (3) backward blocks which are the result of only prediction in the backward direction, and (4) bi-predictive blocks which are the result of prediction in both directions.

In a DCT 103 in this predictive encoding portion, DCT which is a kind of Fourier transformation is performed, and the resultant DCT coefficient is quantized in a quantization circuit 104. After the quantization, variable length encoding is performed in a variable length encoding means 109 wherein codes having different lengths are assigned depending on the probability of occurrence. The quantized signals are subjected to reverse quantization at a reverse quantization circuit 105 and reverse DCT at a reverse DCT 106. Then, the output of a frame memory predictor 108 is added to the signals to reproduce the original image signals. The reproduced image signals are supplied to a subtracter 102 as prediction signals.

The predictive encoding signals output by the variable length encoding means 109 are multiplexed with prediction mode information and motion vector information at a multiplexing means 110. Since such multiplexed data is generated at an irregular rate, it is temporarily accumulated in a buffer 111 to be output at a constant encoding rate. In order to make the average encoding rate constant, control over the amount of code may be carried out by varying a quantization scale factor q of the quantization circuit 104 depending on the amount of the codes accumulated in the buffer 111.

FIG. 8(a) shows the structure for prediction performed between MPEG frames which have been converted into prediction codes. In FIG. 8(a), one GOP (group of pictures) is constituted by, for example, nine frames consisting of one frame of I picture, two frames of P picture and six frames of B picture. A GOP is the unit for encoding which is obtained by dividing one sequence of moving pictures. The I picture is an image obtained by intra-frame predictive encoding. The P picture is an image obtained by inter-frame predictive encoding wherein the temporally preceding frame (I or P picture) which has already been encoded is referred to. The B picture is an image obtained by inter-frame predictive encoding wherein the temporally preceding and succeeding frames are referred to.

Specifically, as indicated by the arrows, an I picture I0 is subjected to predictive encoding only in its frame; a P picture P0 is subjected to inter-frame predictive encoding wherein the I picture I0 is referred to; B pictures B0 and B1 are subjected to inter-frame predictive encoding wherein the I picture I0 and P picture P0 are referred to; and B pictures B2 and B3 are subjected to inter-frame predictive encoding wherein two pictures, i.e., the P pictures P0 and P1 are referred to. Predictive encoding is similarly repeated to create the subsequent pictures.

As to the decoding of pictures which have been subjected to predictive encoding as described above, an I picture can be decoded independently because it has been subjected to intra-frame predictive encoding; the decoding of a P picture involves the temporally preceding I or P picture because it has been subjected to predictive encoding with reference to the temporally preceding I or P picture; and the decoding of a B picture involves the temporally preceding and succeeding I or P pictures because it has been subjected to predictive encoding with reference to the temporally preceding and succeeding I or P pictures. In order to pre-decode the pictures involved in decoding, the pictures are rearranged as shown in FIG. 8(b).

As shown in FIG. 8(b), the rearrangement is carried out such that the I picture I0 precedes B pictures B-1 and B-2 which need the I picture I0 to be decoded; the P picture P0 precedes the B pictures B0 and B1 which need the I picture I0 and P picture P0 to be decoded; and, similarly, the P picture P1 precedes the B pictures B2 and B3 which need the P pictures P0 and P1 to be decoded.

The I, P, and B pictures are recorded on a DVD in the order as shown in FIG. 8(b). Since those pictures have been subjected to predictive encoding as described above, the amount of the codes is not constant for those pictures but varies depending on the complicatedness, flatness, and the like of the images. Those pictures are recorded on the DVD using sectors which are each defined by a predetermined amount of codes. A method of recording utilizing such sectors is shown in FIG. 9 wherein, for example, the I picture I0 is recorded in a sector m, a sector (m+1) and a part of a sector (m+2), and the B picture B-2 is recorded in the remaining area of the sector (m+2) and a sector (m+3). The subsequent pictures are sequentially recorded in sectors. In this example, one GOP is recorded in sectors from sector m through sector (m+13). It is not always true that a GOP is recorded in such a number of sectors. In general, the number of sectors in which one GOP is recorded varies depending on the image because the amount of codes varies depending on the complicatedness and flatness of the image.

FIG. 10 shows an example of a configuration of a disc data reproducing apparatus which reproduces pictures which have been compress-recorded on a disc on an MPEG basis. In FIG. 10, a disc 1-1 is controlled by a spindle motor (not shown) for rotation at a predetermined speed. A pick-up 1-2 directs a laser beam to the track on the disc 1-1 to read the digital data recorded in the track on an MPEG basis. This digital data is demodulated by a demodulation circuit 1-3 and is input to a sector information detection means 2. The output of the pick-up 1-2 is input to a phase-locked loop (PLL) circuit 1-4 which in turn reproduces a clock. The reproduced clock is supplied to the demodulation circuit 1-3.

The digital data on the disc 1 is recorded in sectors each having a fixed length shown in FIG. 9 as described above. Each sector has a sector sync and a sector header at the beginning thereof. In a sector detection circuit 2-1, the boundary between the sectors is detected by detecting the sector sync, and a sector address and the like are detected from the sector header and are supplied to a control circuit 4-1 of a memory means 4. Further, in order to correct errors in the demodulated output, the demodulated output is input to an ECC (error correction circuit) 2-2 through a sector detection circuit 2-1 in which errors are detected and corrected. The error-corrected data is supplied from the ECC 2-2 to a ring buffer memory 4-2 and is written therein under the control of the control circuit 4-1.

Focus and tracking control over the pick-up 1-2 is performed by a tracking servo circuit and a focus servo control circuit according to a focus error signal and a tracking error signal obtained from the information read by the pick-up 1-2 under the control of a system controller. The control circuit 4-1 specifies the address in the ring buffer memory 4-2 into which each sector detected by the sector detection circuit 2-1 is to be written based on the sector address of the sector using a write pointer WP. Further, the control circuit 4-1 specifies the address in the ring buffer memory 4-2 from which data is to be read based on a code request signal supplied by a video code buffer 6-1 provided downstream thereof using a read pointer RP. The data in the position of the read pointer RP is read and is supplied to and stored in the video code buffer 6-1.

The data stored in the video code buffer 6-1 is transferred to a reverse VLC circuit 6-2 in accordance with a code request signal from the reverse VLC circuit 6-2 to be subjected to a reverse VLC process. When the reverse VLC process is complete, the resultant data is supplied to a reverse quantization circuit 6-3, and a code request signal is sent to the video code buffer 6-1 to request the input of new data. The reverse VLC circuit 6-2 also outputs a quantization step size to the reverse quantization circuit 6-3 and outputs motion vectors to a motion compensation circuit 6-6. In the reverse quantization circuit 6-3, the input data is subjected to reverse quantization in accordance with the instructed quantization step size and is output to a reverse DCT circuit 6-4. The reverse DCT circuit 6-4 performs a reverse DCT process on the input data and supplies the result to an adding circuit 6-5.

The adding circuit 6-5 adds the output of the reverse DCT circuit 6-4 and the output of the motion compensation circuit 6-6 depending on the type of the picture (I, P, and B) and outputs the result to a frame memory bank 6-9. Decoded data output by the frame memory bank 6-9 after being rearranged in the initial order of frames as shown in FIG. 8(a) as a result of control over a switch 6-8 is converted into an analog video signal by a digital-to-analog (D-A) converter 6-10 and is displayed on a display 6-11.

Assume that frames recorded in the order as shown in FIG. 8(b) are reproduced. First, when an I picture is decoded, the output of the reverse DCT circuit 6-4 is sent as it is to the frame memory bank 6-9 because this type of picture has not been subjected to inter-frame prediction. In the case of a P or B picture, the decoded I or P picture which has been referred to during predictive encoding of the same is sent from the frame memory bank 6-9 to the motion compensation circuit 6-6, and a motion prediction image is created according to motion vector information supplied by the reverse VLC circuit 6-2 and is supplied to the adding circuit 6-5. In the adding circuit 6-5, the output of the reverse DCT circuit 6-4 is added to the image. The image is thus decoded and is stored in the frame memory bank 6-9.

In response to a code request signal from the video code buffer 6-1, the control circuit 4-1 supplies the data stored in the ring buffer memory 4-2 to the video code buffer 6-1. For example, if data processing on simple pictures continues resulting in a reduction in the amount of the data transferred to the reverse VLC circuit 6-2, the amount of the data transferred from the ring buffer memory 4-2 to the video code buffer 6-1 is also reduced. This increases the amount of the data stored in the ring buffer memory 4-2. This results in a possibility that the write pointer WP gets ahead of the read pointer RP, causing an overflow of the ring buffer 4-2.

This problem is avoided by an arrangement wherein the amount of the data currently stored in the ring buffer memory 4-2 is calculated from the addresses of the write pointer WP and read pointer RP which are controlled by the control circuit 4-2 and, if the amount of data exceeds a predetermined reference value, a track jump determination circuit 7 determines that there is the possibility of an overflow of the ring buffer 4-2 and outputs a track jump command to the circuit 1-5.

Since the rate of the write pointer WP is normally higher than that of the read pointer RP, if the calculated amount of data exceeds a certain level, the write pointer WP is stopped to interrupt writing in order to prevent an overflow. Then, only the read pointer RP is advanced to reduce the amount of remaining data. When the amount of remaining data falls below a preset value, control is performed so that writing is resumed and the write pointer WP is advanced again.

In this case, when the track jump determination circuit 7 outputs the track jump command, the tracking servo circuit 1-5 causes a track jump of the reproduction position of the pick-up 1-2. Specifically, if data is recorded from the side of the inner circumference of the disc 1-1 toward the outer circumference thereof, the pick-up 1-2 jumps from its current position to the next track on the side of the inner circumference. Then, until the reproduction position of the pick-up 1-2 reaches the position before the jump, i.e., until the sector No. obtained from the sector detection circuit 2-1 agrees with the sector No. at the time of the track jump, the writing of new data into the ring buffer memory 4-2 is stopped, and the data in the ring buffer memory 4-2 that is pointed by the read pointer RP is read and transferred to the video code buffer 6-1 as needed.

Even if the sector No. obtained by the sector detection circuit 2-1 after the track jump agrees with the sector No. before the jump, if the amount of the data remaining in the ring buffer memory 4-2 is in excess of a predetermined reference value, the writing of data into the ring buffer memory 4-2 is not resumed and another track jump takes place. The ring buffer memory 4-2 has a memory capacity to allow the storage of data in at least one track (one rotation) of the disc 1-1.

The rate at which data is transferred from the ring buffer memory 4-2 to the video code buffer 6-1 is set to a value equal to or lower than the rate at which data is transferred from the ECC circuit 2-2 to the ring buffer memory 4-2. This allows a code request for the data transfer from the video code buffer 6-1 to the ring buffer memory 4-2 to be freely transmitted regardless of the timing of the track jump. Thus, in the data reproduction apparatus shown in FIG. 10 in which the pick-up 2 makes a track jump in accordance with the memory capacity of the ring buffer memory 4-2, it is possible to prevent an overflow or underflow of the video code buffer 6-1 regardless of the complicatedness and flatness of the reproduction pictures read from the disc 1-1, thereby allowing pictures of uniform image quality to be reproduced for a long period of time.

In a system that handles data compressed using MPEG or the like, the amount of the compressed data generally depends on the complicatedness and flatness of the pictures. Therefore, the compressed data is treated using sectors of a fixed length as described above, or the like. Since the amount of data is thus indefinite, if there are different kinds of data such as I, P, and B pictures and the like as in the case of MPEG, one sector is not necessarily occupied by the same kind of data, and plural kinds of data can exist in one sector. It is therefore necessary to add a particular pattern, information on the attributes of data, and the like to a boundary in a sector at which a kind of data is switched to another.

Thus, a particular pattern is provided in data, and the position and the value of the next data from the pattern may be treated as meaningful information (attribute information). Signal processing at a decoder is performed similarly by detecting a particular pattern. However, when there is an error in reproduction data or the pick-up makes a track jump due to external factors, such a particular pattern can not be detected because data input to a decoder becomes erroneous or discontinuous.

As described above, if synchronization at a decoder is disturbed, there is no means for recovering synchronization other than waiting for the detection of the particular pattern that comes next in the data. This has resulted in a problem in that it takes a long time to recover the normal operation of the system.

SUMMARY OF THE INVENTION

It is an object of the present invention to provide a method and apparatus for reproducing data which allow a reduction in the time required for recovery from the occurrence of an error.

According to the present invention, the above-described object is achieved in a method and apparatus for reproducing data wherein data read from a disc is demodulated and written in a memory means and data read from the memory means is decoded to reproduce the original data by employing an arrangement wherein data is recorded in the disc on a sector basis; sector information associated with the sectors of demodulated data is detected; and the writing and reading operations on the memory means are controlled based on the detected information.

According to the present invention, control over the memory means and a distribution means is performed on the basis of units (sectors) for data access to a disc. Therefore, even if the synchronization of data at the distribution means and decoder is disturbed, the synchronization on a sector basis can be recovered. Further, if there is an error in the data detected by the distribution means, the sector including the erroneous data can be re-accessed to allow stable reproduction of data.

With the above-described configuration according to the present invention wherein control over the memory means and a distribution means is performed on the basis of units (sectors) for data access to a disc, even if the synchronization of data at the distribution means and decoder is disturbed, the synchronization on a sector basis can be recovered. Further, if there is an error in the data detected by the distribution means, the sector including the erroneous data can be re-accessed to allow stable reproduction of data.

In addition, if information on the attributes of data is stored as sector information, a control means can easily buffer the data of particular pictures in the memory means without the need for processing the contents of the data. This makes it possible to perform reproduction in a special manner easily and quickly.

DETAILED DESCRIPTION OF PREFERRED EMBODIMENTS

Figure 1:
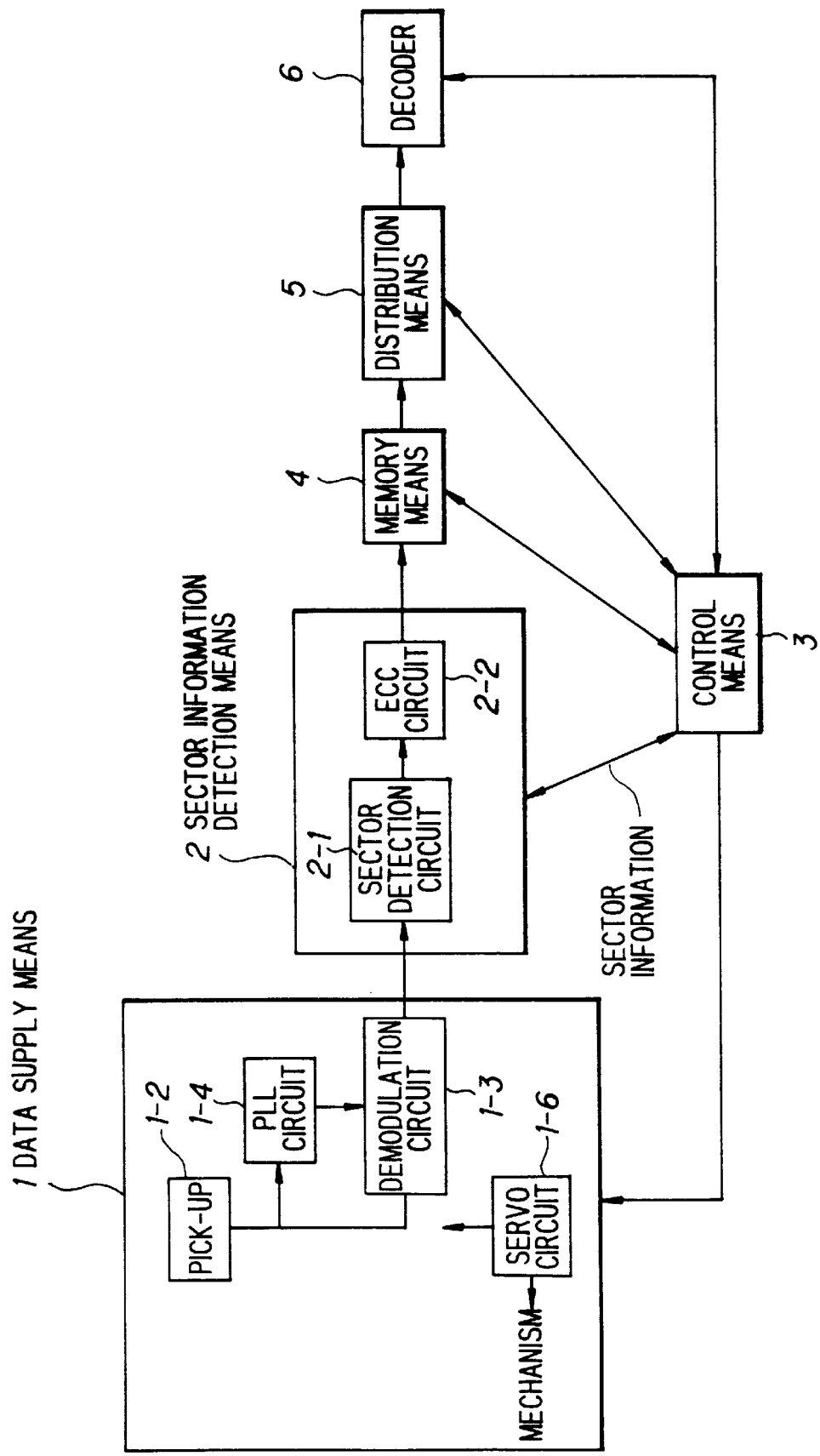
FIG. 1 shows a configuration of an embodiment of a data reproduction means according to the present invention.
Figure 10:
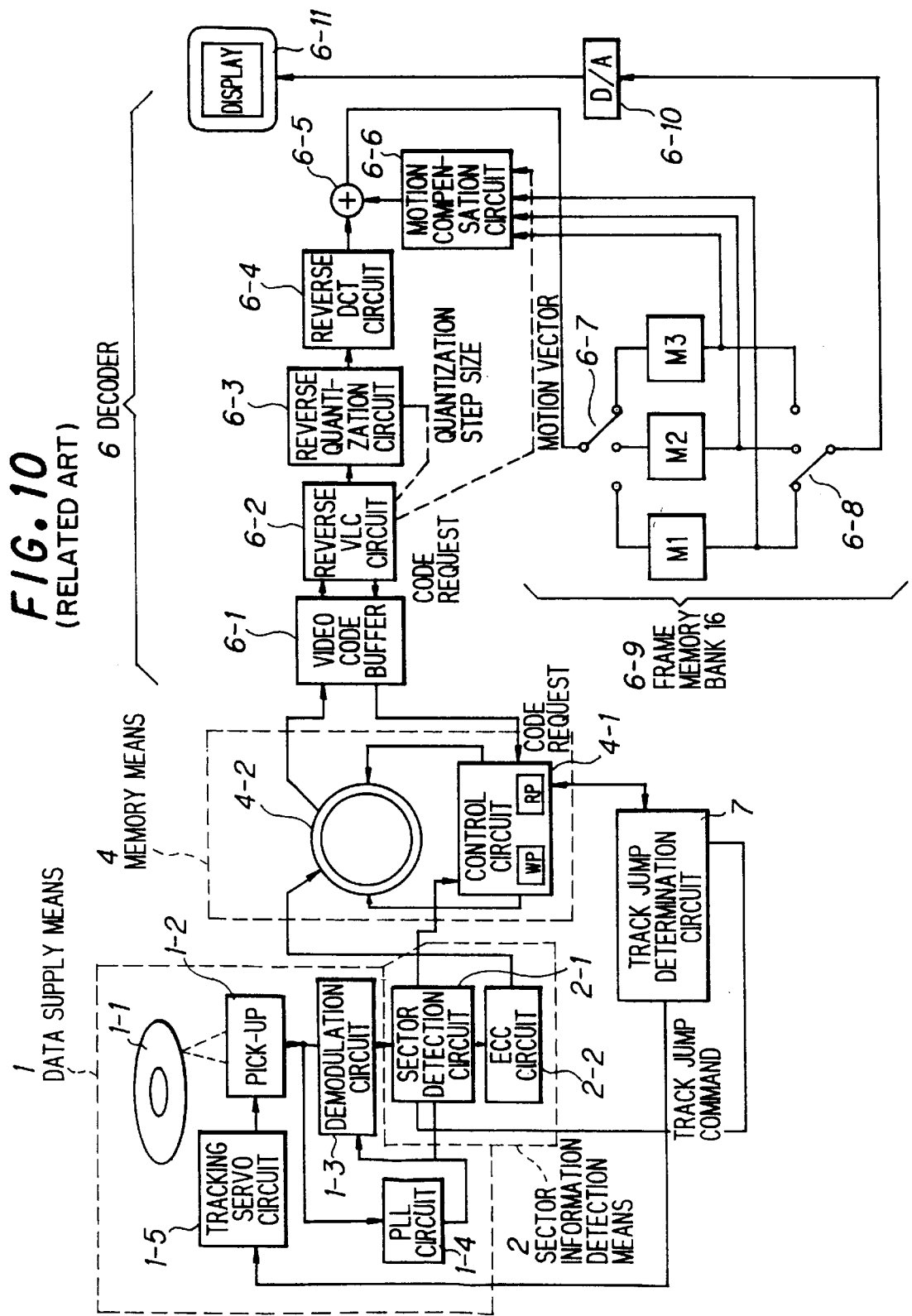
FIG. 10 shows an example of a configuration of a data reproduction means.

FIG. 1 shows a configuration of an embodiment of a data reproduction apparatus in which a method of reproducing data according to the present invention is implemented. In FIG. 1, the parts having their counterparts in the configuration shown in FIG. 10 are indicated by like reference numbers.

In FIG. 1, a data supply means 1 reads video signals, audio signals, and the like recorded on a disc using MPEG basis on a sector basis by accessing the disc and is constituted by a pick-up 1-2 for reading the data recorded on the disc by irradiating the disc with laser beams, a demodulation circuit 1-3 for demodulating the data read by the pick-up 1-2, a phase-locked loop (PLL) circuit 1-4 for reproducing a clock from the data read by the pick-up 1-2 and for supplying the reproduced clock to the demodulation circuit 1-3, and a servo circuit 1-6 for performing various types of servo control by supplying control signals to mechanisms such as a focus coil, a tracking coil, and a motor.

A sector information detection means 2 is constituted by a sector detection circuit 2-1 for detecting sector information of the data output by the data supply means 1 and for supplying the sector information to a control means 3 and an error correction circuit (ECC) 2-2 for detecting and correcting errors in input data. The control means 3 controls the writing of data into a memory means 4 and controls the reading of data from the memory means 4 based on the sector information when a code request signal is applied by a distribution means 5. The data output by the sector information detection means 2 is written in the memory means 4 on a sector basis. Such write and read operations are controlled by the control means 3.

The distribution means 5 analyzes the information on the attributes of the data in a sector and distributes the data to decoders 6 depending on the attributes. The decoders 6 include at least a decoder for decoding video data on an MPEG basis and a decoder for decoding audio data.

Figure 2:
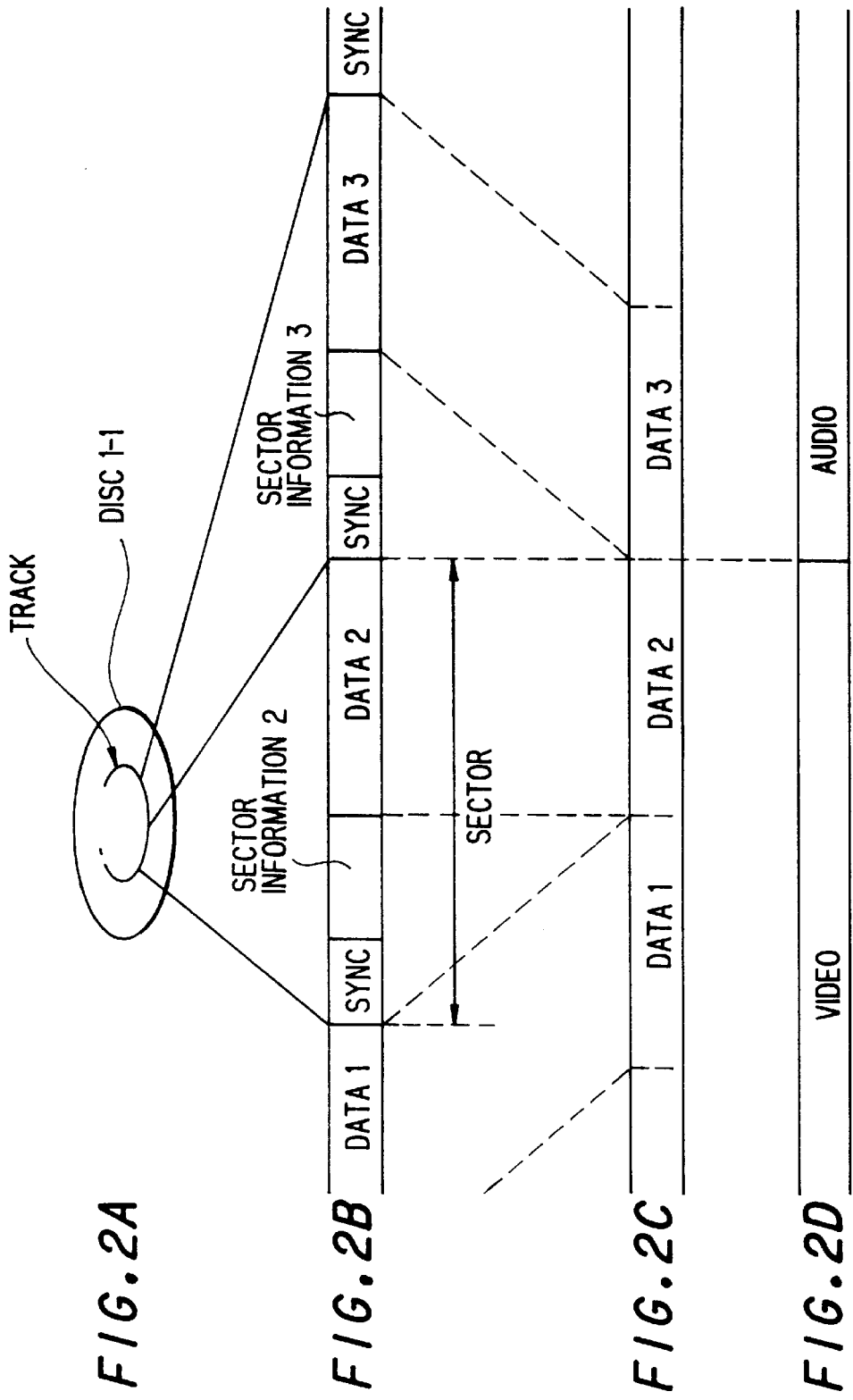
FIG. 2a, FIG. 2b, FIG. 2c, and FIG. 2d illustrate sectors recorded in a track of a disc.

In a data reproduction apparatus having such a configuration, the data in the tracks of the disc 1-1 is recorded in sectors each having a fixed length as shown in FIG. 2a. Such a sector is a unit to be used for access to the disc 1. As shown in FIG. 2b, a sector is constituted by a sector sync for indicating the boundary of the sector, a sector header consisting of a sector address indicating the position of the sector and data indicating time information and the like, and main data (data 1, data 2, data 3, etc.) including video data, audio data, and the like.

As shown in FIG. 2d, each of the video and audio data is constituted by a continuous data string. Such data is divided into data 1, data 2, data 3, etc. each having a predetermined length, and the sectors as shown in FIG. 2b are obtained by adding sector sync and sector information to each of the divided data at the beginning thereof.

Figure 3:
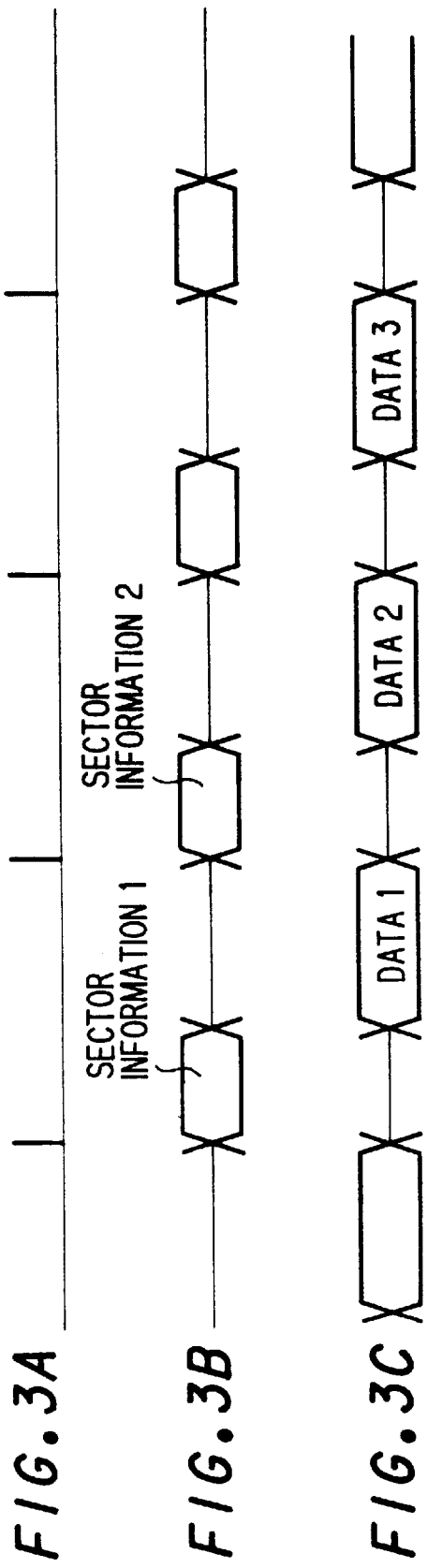
FIG. 3a, FIG. 3b, and FIG. 3c illustrate sectors divided into a sector sync, sector information, and main data.
Figure 6:
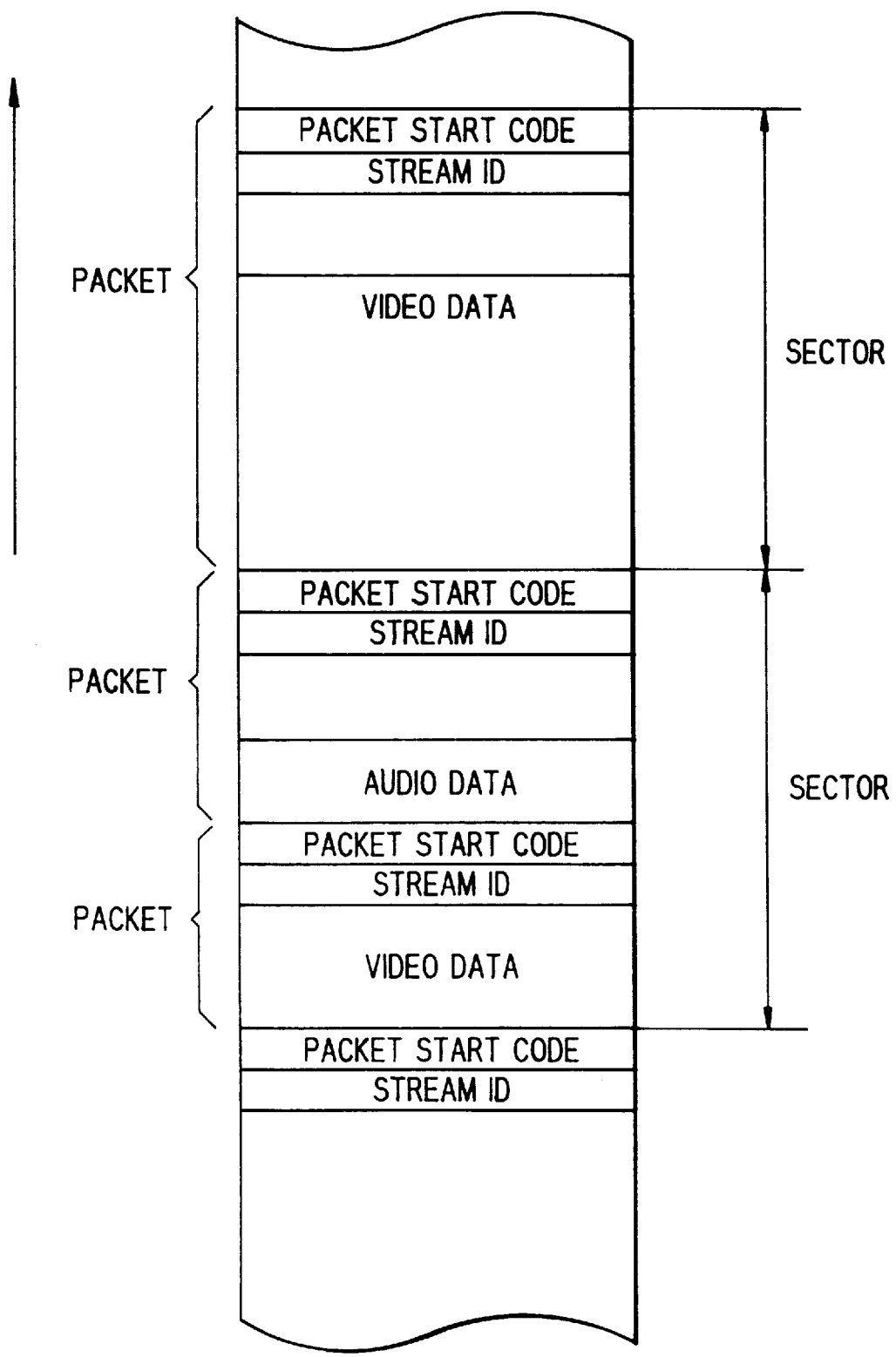
FIG. 6 shows a configuration of an example of data in a data reproduction means according to the present invention.
Figure 7:
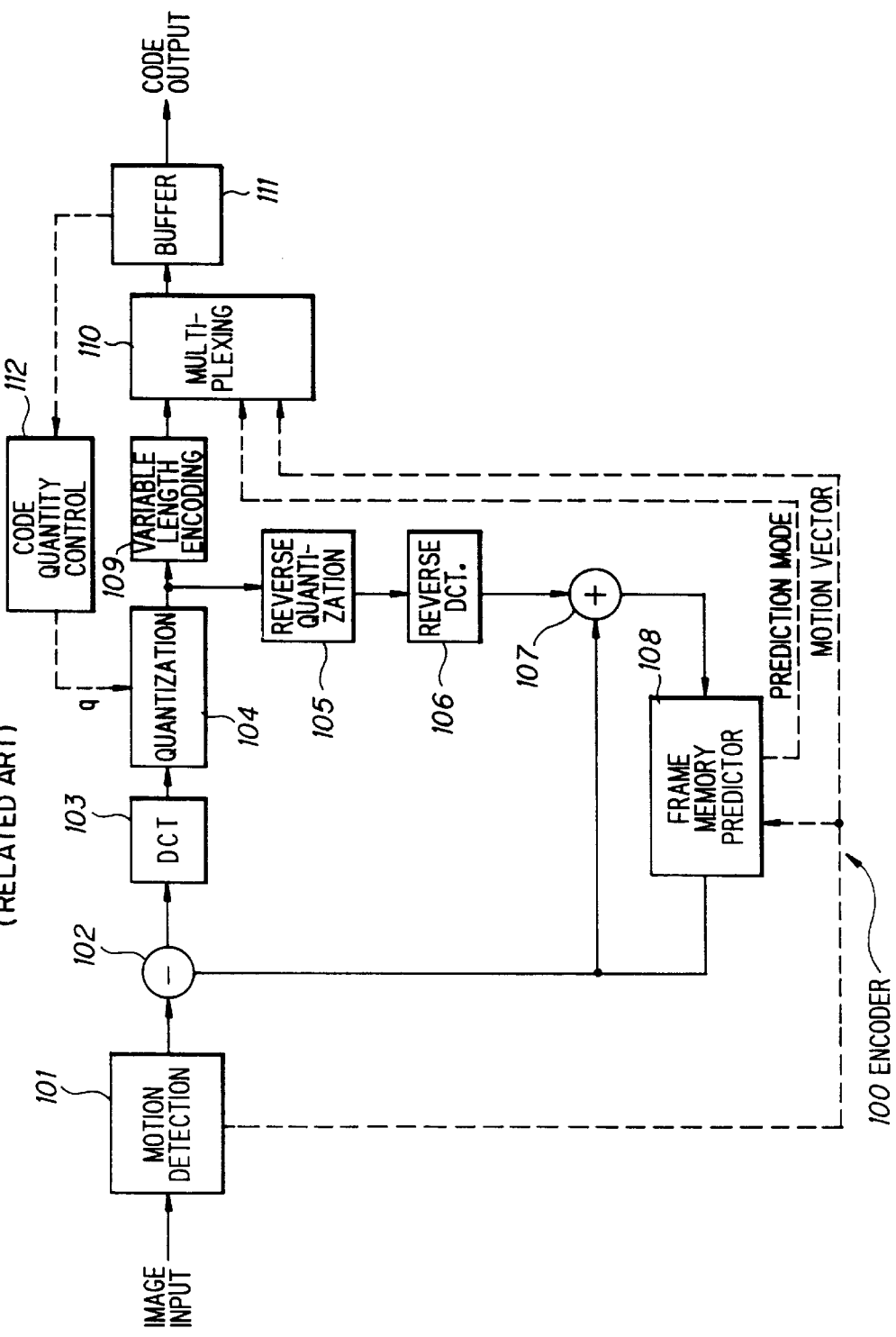
FIG. 7 shows an example of a configuration of an MPEG encoder.
Figure 8A:
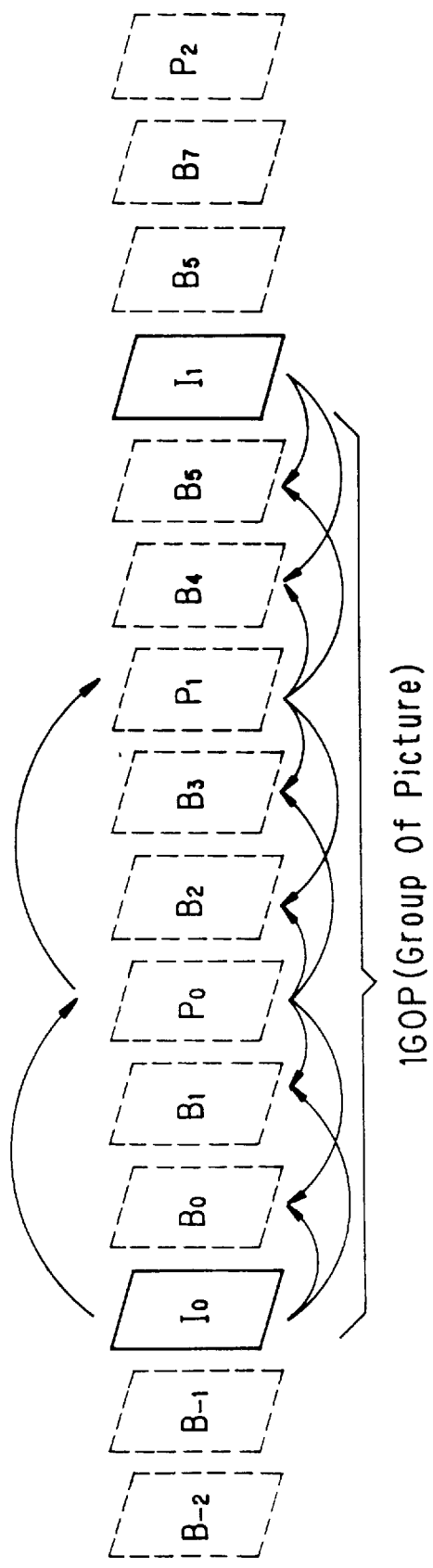
FIG. 8a shows a structure for inter-frame prediction.
Figure 8B:
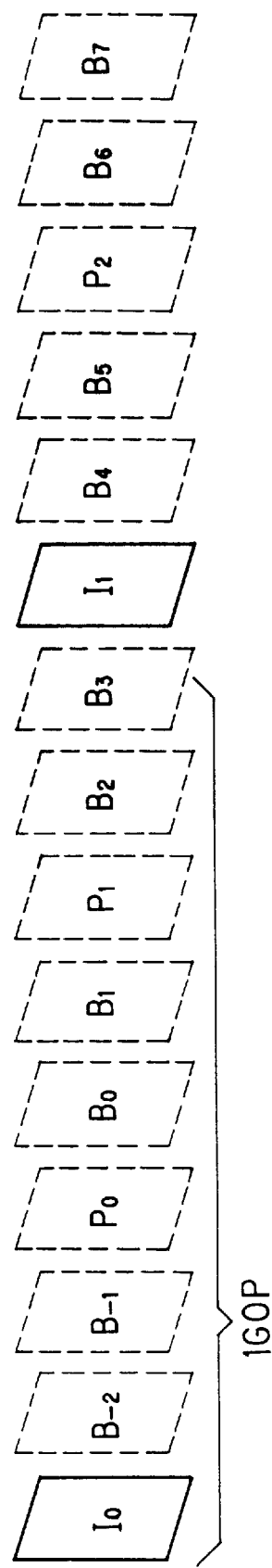
FIG. 8b shows a structure of recorded frames.
Figure 9:
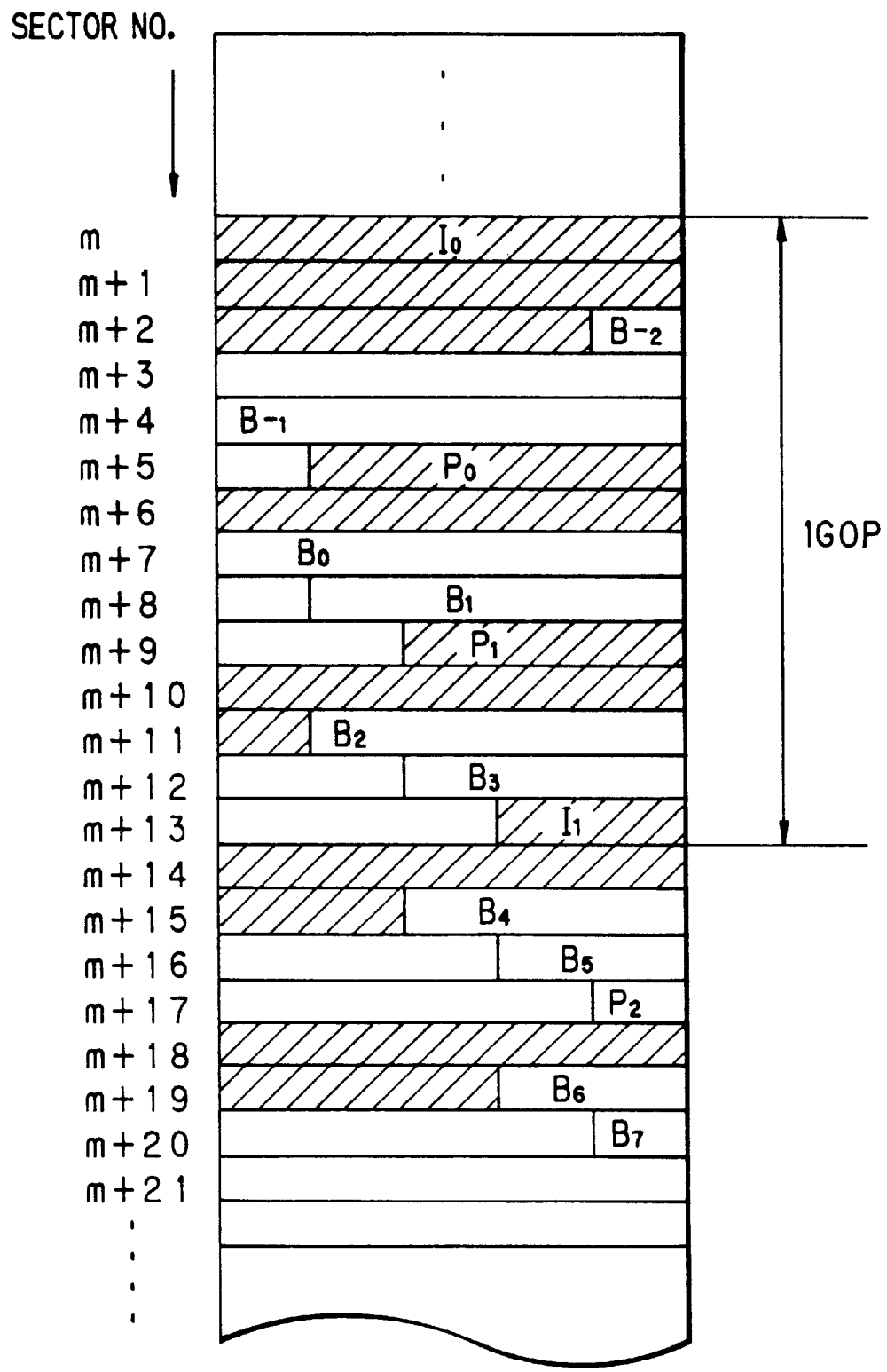
FIG. 9 is a diagram for explaining a structure of data recorded on a disc.

When the data recorded on a sector basis as described above is supplied from the data supply means 1 to the sector information detection means 2, the sector sync is detected by the sector detection circuit 2-1 and a sector sync signal as shown in FIG. 3a is generated. At the same time, the sector information and the main data are separated as shown in FIG. 3b and FIG. 3c, and the sector information is supplied to the control circuit 3. An example of the main data is shown in FIG. 6 wherein video or audio data is included in a frame called "packet" which is headed by a particular pattern called "packet start code" and includes a stream ID code in a predetermined position that follows the packet start code. A stream ID code includes information indicating whether the data included in the relevant packet is audio data, video data, or another type of data. Information on the length of the data and the like is included in the area that follows the stream ID code.

Specifically, when a packet includes video data, the stream ID includes a code indicative of video data. In the case of audio data which is smaller in amount, two packets of audio data may be included in one sector as shown in FIG. 6. Thus, according to the present invention, one sector includes one or more packets and the data, and the data at the beginning of a sector is always a packet start code.

Figure 4:
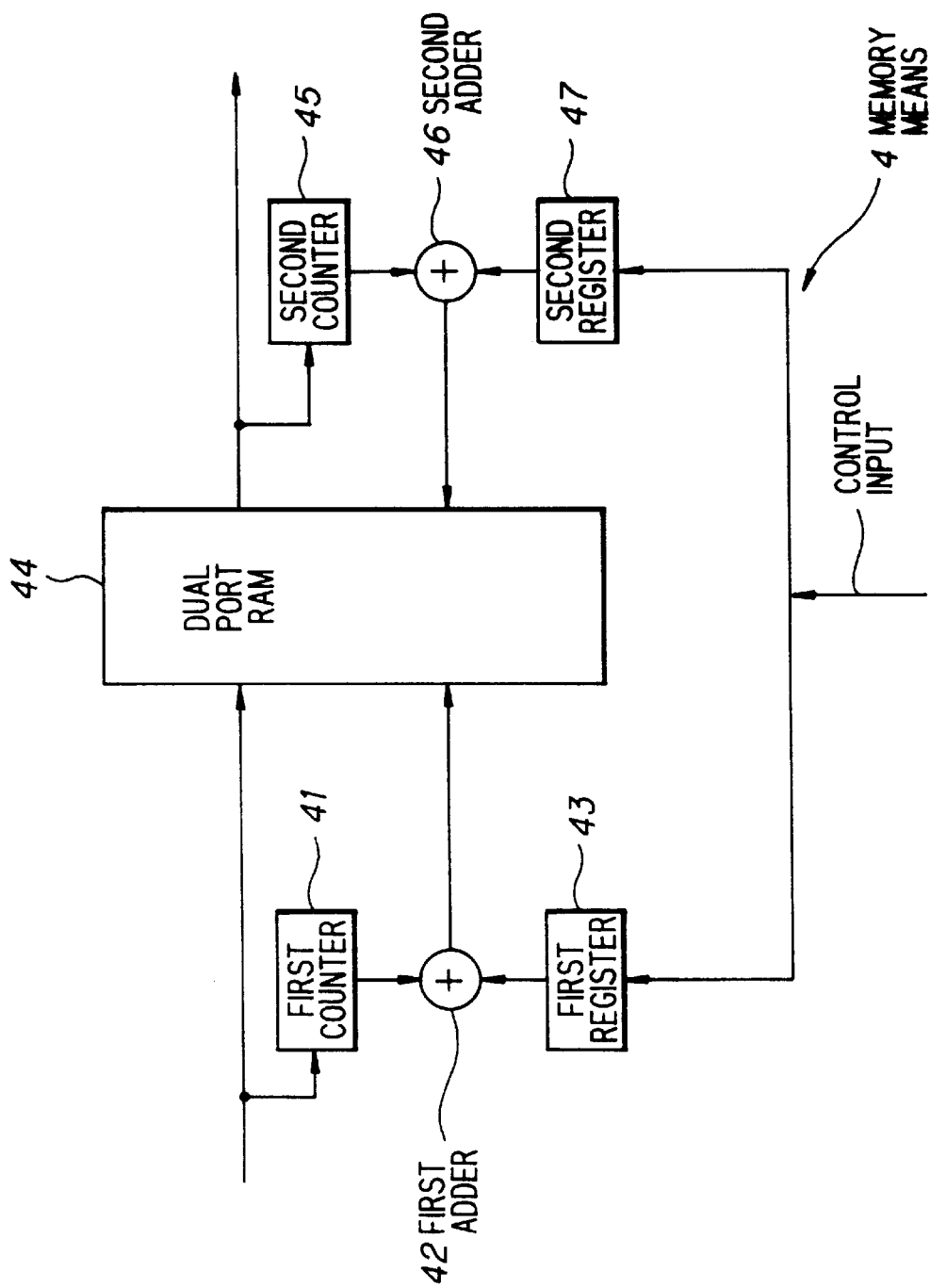
FIG. 4 shows a detailed configuration of a memory means of a data reproduction means according to the present invention.

FIG. 4 shows a detailed configuration of the memory means 4 in which a first counter 41 counts up in response to the input of data; a first register 43 sets a write address in accordance with the output of the control means 3; a first adder 42 adds the outputs of the first counter 41 and the first register 43 to generate an address in a dual port RAM 44 where writing is to be performed; the RAM 44 has a dual port; a second counter 45 counts up in response to the output of data; a read address for a second register 47 is set by the control means 3; and a second adder 46 adds the outputs of the second counter 45 and the second register 47 to generate an address in the dual port RAM 44 where reading is to be performed.

In the operation of the memory means 4 having such a configuration, an address in the dual port RAM 44 is set in the first register 43 by the control means 3. Then, the first adder 42 generates a leading address for writing into the dual port RAM 44 to specify a position in the dual port RAM 44 where writing is to be performed. Next, the sector information detection means 2 transfers data in sectors which is written in the dual port RAM 44. Each time data is transferred, the first counter 41 counts up, and the value in the first adder is also increased from the value set in the first register 43. In other words, as the output data of the sector information detection means 2, the data included in a sector is sequentially written in the number of items of data which corresponds to the increase in the address from the value set in the first register 43.

On the other hand, a read address is set in the second register 47 by the control means 3 also for the data which is read from the dual port RAM 44 to be output to the distribution means 5, and this allows the second adder 46 to generate a leading read address in the dual port RAM 44. Then, the leading read position is instructed to the dual port RAM 44. This initiates the reading of data from the dual port RAM 44. Each time data is output, the second counter 45 counts up, which increases the read address generated by the second adder 46. As a result, data corresponding to the number of items of data included in the sector is read from the dual port RAM 44 in correspondence to the increase in the read address. Thus, the control means 3 can easily control the buffering of the data continuously input from the sector information detection means 2 on a sector basis.

Figure 5:
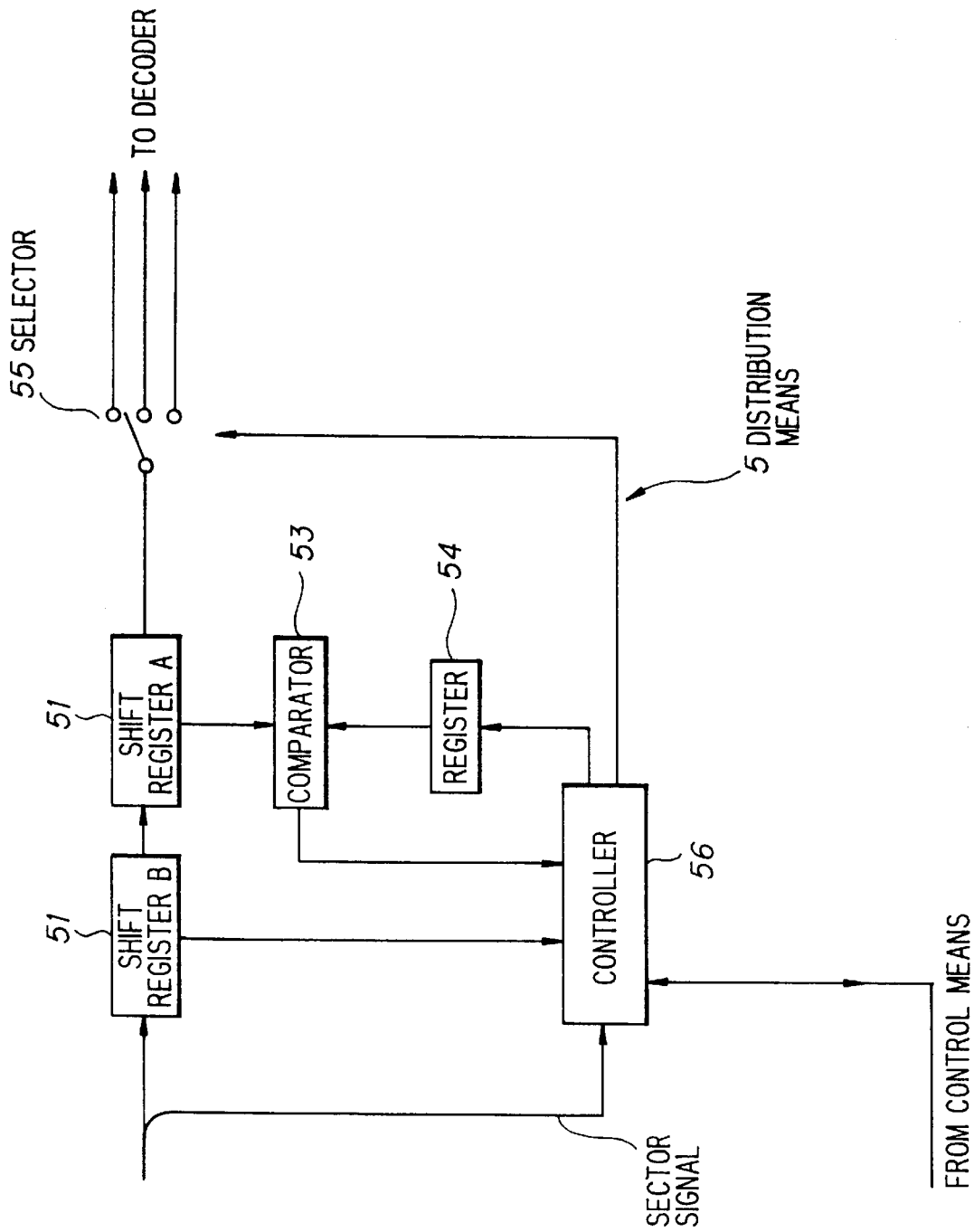
FIG. 5 shows a detailed configuration of a distribution means of a data reproduction means according to the present invention.

The data output by the dual port RAM 44 is input to the distribution means 5. A detailed configuration of this distribution means 5 is shown in FIG. 5. In the distribution means 5 shown in FIG. 5, the data output by the dual port RAM 44 on a sector basis is accumulated in a shift register B51, and the data output by the shift register B51 is accumulated in a shift register A52. A controller 56 sets a data pattern (packet start code) which is to be retrieved from a data string in a register 54. A comparator 53 compares the pattern of the data accumulated in the shift register A52 with the data pattern set in the register 54 and informs the controller 56 when the two data patterns coincide. In response to this, the controller 56 refers to the data in the shift register B51 (which corresponds to the stream ID) and operates the selector 55 so that the subsequent data strings are distributed among a plurality of decoders 6 depending on the types of data.

If an error is included in the data supplied from the memory means 4, the controller 56 is unable to detect the packet start code. As a result, it can not appropriately distribute the data among the decoders 6. This can lead to a possibility that wrong data such as audio data is distributed to a video decoder. Even in such a case, since the packet start codes are provided at the boundaries of the sectors, sector signals (sector sync) indicating the boundaries between the sectors in synchronism with the data supplied by the memory means 4 allow the synchronization of the controller 56. This makes it possible to process the subsequent data and to shorten the time required for recovery from the occurrence of the error.

Since the memory means 4 performs processing and buffering on a sector basis as described above, the sector signals indicating the boundaries between sectors in synchronism with the data can be generated regardless of the state of the data supply means 1. If the sector sync can not be detected, the disc 1-1 may be re-accessed to obtain the sector sync.

In the case of data such as audio data wherein one sector includes two or more packets, the packet start codes of the second and subsequent packets are not located at the beginning of the sector. This means that the stream ID's for such packets can not be detected from the sector No. In such a case, since the data length information is provided in the area that follows the stream ID, an analysis on this length information will allow the detection of the stream ID's for the second and subsequent packets. Therefore, even if one sector includes two or more packets, it is possible to shorten the time required for recovery from the occurrence of an error.

Next, assume that the controller 56 detects abnormality in audio or video data. Then, since the processing in the controller 56 is performed on a sector basis, the control means 3 can know the sector including the data having abnormality. Then, an access command may be output to the data supply means 1 to read data having no abnormality from the disc. This improves the recovery function of a data reproduction apparatus against an error.

Another embodiment of the present invention will now be described. In this embodiment, sector information includes, in addition to information on the position of the sector, information on the attributes of the data (information on whether it is audio data, the picture type if the data is video data, the stream ID, etc.). In most systems that handle MPEG's, for example, only the data of I pictures are processed by decoders in order to perform reproduction in a special manner. In such a case, according to the above-described embodiment, there is no way other than using the information from the decoders 6 to detect the positions of I pictures in the data output by the data supply means 1.

In the present embodiment, information on the attributes of data is included in sector information to allow a signal indicating the presence or absence of particular pictures, e.g., I pictures, to be included in the sector information output by the sector information detection means 2. This makes it possible to detect the positions of the data of, for example, I pictures. Therefore, the control means does not need to process the contents of the data and can very easily buffer the data of I pictures or the like in the memory means 4. Further, in the memory means 4 and distribution means 5, processing is performed on a sector basis under the control of the control means 3 as in the above-described embodiment. This allows the control means 3 to perform control in such a manner that the data which has been input based on information on sector headers can be managed and transferred to the decoders 6 on a sector basis. As a result, there is a significant advantage in that special reproduction can be performed easily and quickly.

Although the present embodiment has been described with reference to I pictures, the present invention is not limited to I pictures which have been mentioned as an example of data included in sectors. Further, according to the present invention, either optical discs or magneto-optical discs may be used.

While the invention has been described with reference to specific embodiments, it will be apparent to those skilled in the art that various changes and modifications may be made within the purview of the invention without departing from the scope of the invention defined in the appended claims.

What is claimed is:

1. A method for reproducing data from a recording medium, comprising the steps of:

reading data recorded in said recording medium on a sector basis, in which the data recorded in each sector includes at least one of audio and video data and in which the data of each said sector is arranged in one or more packets wherein each packet includes a packet start code and a stream identification code located in front of audio or video data which indicates whether audio or video data is included in the respective packet and in which boundaries between respective packets are synchronized with boundaries between respective sectors wherein a respective packet start code is provided at a boundary of each said sector;

detecting sector information associated with a respective sector from the read data;

controlling writing and reading operations of the data read from said recording medium into and from a memory on a sector basis based on said detected information;

reading the data stored in said memory and determining a distribution of the data read from said memory on a sector basis; and decoding the data read from said memory in accordance with the determined distribution, wherein when synchronization of the data is disturbed due to a data error, the synchronization of the data is recoverable by use of the packet start codes provided at the boundaries of the sectors.

2. The method according to claim 1, wherein the step of determining distribution includes analyzing the data read from said memory so that said data is distributed to a decoder appropriate for the type of the data identified by the analysis.

3. A method for reproducing data comprising the steps of:

reading data recorded in a disc on a sector basis, in which the data recorded in each sector includes at least one of audio and video data and in which the data of each said sector is arranged in one or more packets wherein each packet includes a packet start code and a stream identification code located in front of audio or video data which indicates whether audio or video data is included in the respective packet and in which boundaries between respective packets are synchronized with boundaries between respective sectors wherein a respective packet start code is provided at a boundary of each said sector;

demodulating the data read from said disc;

writing the demodulated data in a memory;

detecting sector information associated with the sectors of said disc;

controlling writing and reading operations of said memory on a sector basis based on said sector information detected in said step of detecting sector information;

reading the data stored in said memory and determining a distribution of the data read from said memory on a sector basis; and decoding the data read from said memory in accordance with the determined distribution, wherein when synchronization of the data is disturbed due to a data error, the synchronization of the data is recoverable by use of the packet start codes provided at the boundaries of the sectors.

4. The method according to claim 3, wherein the step of determining distribution includes analyzing the data read from said memory so that said data is distributed to a decoder appropriate for the type of the data identified by the analysis.

5. An apparatus for reproducing data comprising:

data supply means for supplying data on a sector basis, in which the data recorded in each sector includes at least one of audio and video data and in which the data of each said sector is arranged in one or more packets wherein each packet includes a packet start code and a stream identification code located in front of audio or video data which indicates whether audio or video data is included in the respective packet and in which boundaries between respective packets are synchronized with boundaries between respective sectors wherein a respective packet start code is provided at a boundary of each said sector;

sector information detection means for detecting a sector in response to the output of said data supply means and for classifying the output into sector information associated with the sector and information other than the sector information;

memory means for buffering data output by said sector information detection means;

distribution means for analyzing and distributing data read from said memory means;

decoding means having a number of decoders for decoding data output by said distribution means;

control means for controlling data writing and reading operations on said memory means and distribution to a decoder on a sector basis based on the sector information from said sector information detection means; and means for recovering synchronization of the data by use of the packet start codes provided at the boundaries of the sectors when the synchronization of the data is disturbed due to a data error.

6. The apparatus according to claim 5, wherein said decoding means decodes at least the data of a video signal and an audio signal.

* * * * *